(12) United States Patent
Chu et al.

(10) Patent No.: US 10,084,620 B1
(45) Date of Patent: Sep. 25, 2018

(54) NEURAL NETWORK-BASED SYSTEMS FOR HIGH SPEED DATA LINKS

(71) Applicant: Intel Corporation, Santa Clara, CA (US)

(72) Inventors: Yunhui Chu, Portland, OR (US); Fan Chen, Portland, OR (US); John Lang, Hillsboro, OR (US); Charles Phares, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/446,277

(22) Filed: Mar. 1, 2017

(51) Int. Cl.
*H04L 25/03* (2006.01)
(52) U.S. Cl.
CPC .............................. *H04L 25/03165* (2013.01)
(58) Field of Classification Search
CPC .................................................. H04L 25/03165
See application file for complete search history.

(56) References Cited

U.S. PATENT DOCUMENTS

| 4,906,865 | A | | 3/1990 | Holler | |
|---|---|---|---|---|---|
| 5,105,447 | A | * | 4/1992 | Iwane | H04L 7/0331 375/360 |
| 6,052,349 | A | | 4/2000 | Okamoto | |
| 2009/0252265 | A1 | * | 10/2009 | Xia | H03L 7/0814 375/355 |
| 2011/0066579 | A1 | | 3/2011 | Ikada | |
| 2011/0075719 | A1 | * | 3/2011 | Elenes | H04B 1/1081 375/232 |
| 2015/0112908 | A1 | | 4/2015 | Sarah et al. | |
| 2016/0328642 | A1 | | 11/2016 | Himebaugh et al. | |
| 2017/0244950 | A1 | * | 8/2017 | Talstra | H04N 13/0048 |

OTHER PUBLICATIONS

International Search Report and Written Opinion for PCT Application No. PCT/US2018/019581, dated May 24, 2018, 7 pages.

\* cited by examiner

*Primary Examiner* — Jean B Corrielus
(74) *Attorney, Agent, or Firm* — Alliance IP, LLC

(57) ABSTRACT

Aspects of the embodiments are directed to a data transmission receiver that includes a neural network circuit for resolving a received bit value. The data transmission receiver can be coupled to a data transmitter by a high speed data link. The neural network circuit can sample a bit value at multiple locations across the bit's unit interval. The neural network circuit can also sample bit values for neighboring bits to the interested bit at multiple sampling locations across unit intervals for the neighboring bits. The neural network circuit can determine the value of the interested bit from the samples of the waveform.

17 Claims, 11 Drawing Sheets

US 10,084,620 B1

NEURAL NETWORK-BASED SYSTEMS FOR HIGH SPEED DATA LINKS

FIELD

This disclosure pertains to systems for high speed data links and methods for operating the same, and more particularly, using neural network circuitry to resolve bit values.

BACKGROUND

The data rate of high-speed signal links determines system performance of all kinds of devices, ranging from smart phones to super computers. Generational changes of devices involves the increase of data rates of signal links. One example bottleneck is that most (if not all) signal links depend on an open eye diagram to function correctly. A voltage comparator/slicer determines the received bit value between logic 0 and 1 by comparing the sampled voltage at a certain timing point to a reference voltage.

Thus this mechanism requires the eye diagram be open with a certain amount of margin. There are numerous factors, including jitter, noise, crosstalk, channel bandwidth/filtering, etc. that can shrink the eye diagram. When the eye diagram is closed or the margin is insufficient, the receiver will fail to recover the correct data that are transferred. Currently, various equalization (EQ) schemes are used to improve the eye diagram, including transmitter linear EQ (TXLE), continuous time linear EQ (CTLE), and decision feedback EQ (DFE). These EQ schemes can improve the data rate by some amount but will fail when the degrading factors are too severe or the data rate is further increased.

DETAILED DESCRIPTION

Figure 1A:
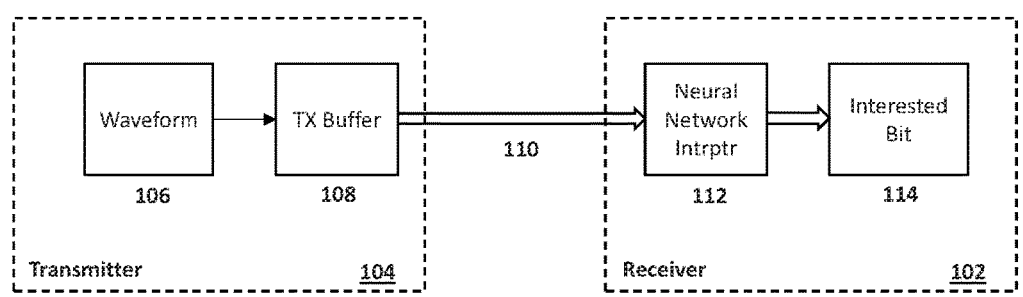
FIG. 1A is a schematic diagram of an example receiver flow that includes a neural network circuit element in accordance with embodiments of the present disclosure.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the disclosure described herein.

This disclosure describes a receiver architecture that uses a neural network-based interpreter circuit that does not depend on an eye diagram for resolving a received bit value.

FIG. 1A is a schematic block diagram of a system 100 that includes a transmitter and receiver coupled by a high speed data link in accordance with embodiments of the present disclosure. The transmitter 104 includes a waveform generator 106 that can output a waveform representative of data to be transmitted across the high speed data link 110. The transmitter 104 also includes a transmission (TX) buffer 108 for buffering data transmitted from the transmitter 104. The receiver 102 includes a neural network interpreter circuit 112. In embodiments, neural network (NN) circuit 112, which is referred to herein as an NN interpreter 112, is used to replace the EQ mechanism. The NN interpreter 112 takes the received voltage waveform as an input. The waveform is sampled at multiple timing points in a few unit intervals (UI) adjacent to the interested bit (i.e., unit intervals both before and after the interested bit), and directly determines the logic value of the interested bit. The use of the NN interpreter facilitates bit resolution even when the eye diagram is completely closed with the traditional EQ mechanism.

Figure 2:
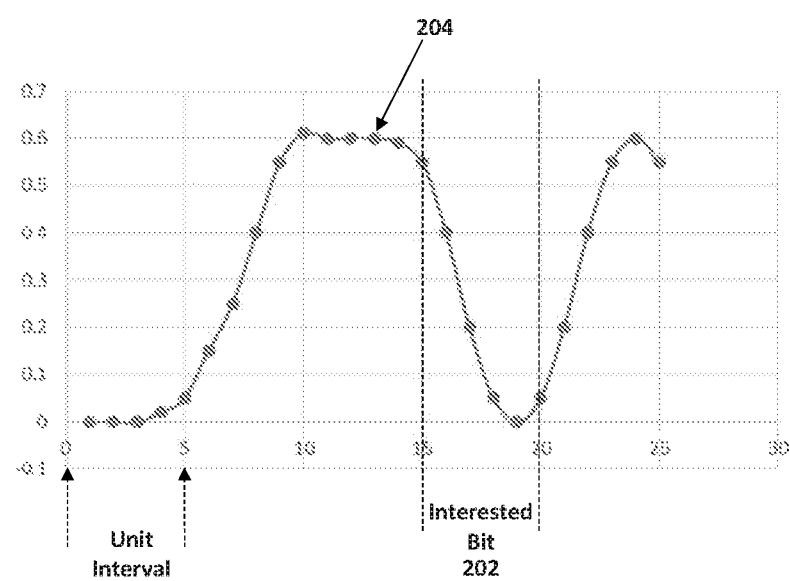
FIG. 2 is an example graphical illustration of a waveform illustrating sampling points of the waveform and an example interested bit in accordance with embodiments of the present disclosure.

Turning briefly to FIG. 2, FIG. 2 is an example graphical illustration of a waveform 200 illustrating sampling points 204 of the waveform and an example interested bit 202 in accordance with embodiments of the present disclosure. The interested bit 202 of waveform 200 is located in a unit interval spanning 15 and 20 UIs. The waveform can be sampled at 25 points using adjacent bits spanning UI 1-5, 6-10, 11-15, and 21-25, as well as sampling points at the interested bit between 16-20.

The input waveform 200 is sampled at different unit intervals adjacent to the interested bit 202. Samples are taken at a predetermined number of UIs before and after the interested bit 202, and the interested bit 202 is also sampled. The sampling makes use of a clock that is associated with the incoming waveform. The input to the NN interpreter 112 includes sampled voltage values of the waveform received by the receiver 102. The NN interpreter 112 outputs the logic value of the interested bit (e.g., a 0 or a 1). The NN interpreter 112 can provide better performance than the EQ mechanism because the NN interpreter 112 determines each logic bit value from multiple samples in the input waveform, whereas the EQ mechanism relies on a slicer to sample the voltage at a single timing point for each bit. Compared to the traditional EQ mechanism, the NN interpreter is more immune to jitter, noise, and TX/RX non-linearity, and thus can achieve much higher data rate.

Figure 1B:
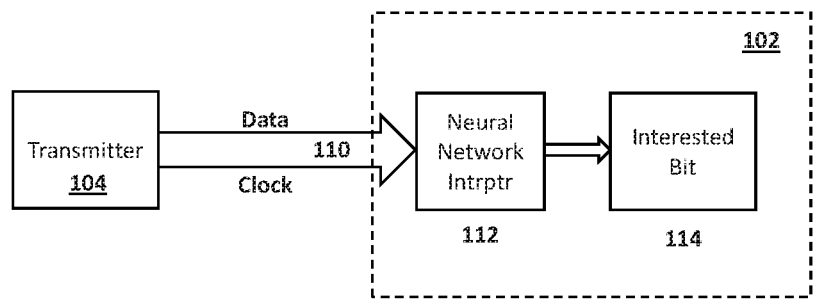
FIG. 1B is a schematic block diagram of a synchronous system that transmits a data waveform separately from a corresponding clock signal over a high speed data link in accordance with embodiments of the present disclosure.
Figure 1C:
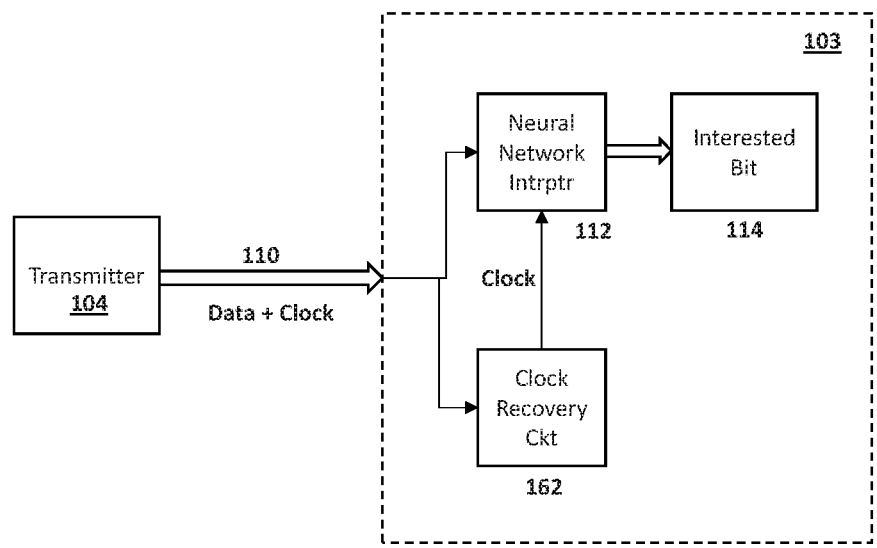
FIG. 1C is a schematic block diagram of an asynchronous system wherein the data and clock signals are transmitted over a single high speed data link in accordance with embodiments of the present disclosure.

FIG. 1B is a schematic block diagram of a synchronous system 150 that transmits a data waveform separately from a corresponding clock signal over a high speed data link in accordance with embodiments of the present disclosure. In system 150, the data and associated synchronized clock are transmitted separately across the high speed data link 110. The NN interpreter 112 can receive the data waveform and the clock signal as separate inputs into the NN interpreter 112. FIG. 1C is a schematic block diagram of an asynchronous system 160 wherein the data and clock signals are transmitted over a single high speed data link 110 in accordance with embodiments of the present disclosure. In system 160, the receiver 103 uses a clock recovery circuit element 162 that is configured to extract the clock signal from the data stream and inputs the clock signal to the NN interpreter 112. The NN interpreter 112 uses the received clock signal to determining sampling points near the interested bit as well as the interested bit location.

The receiver 102 uses the NN interpolator 112 to recover the data symbols directly from the received signal. The neural network circuitry essentially handles a pattern recognition problem for determining the bit value based on neighboring voltage values across a set of unit intervals sampled from the waveform. Time-domain voltage waveforms are used as an example in this document but this disclosure also contemplates being applied to other forms of signals as well.

Figure 3:
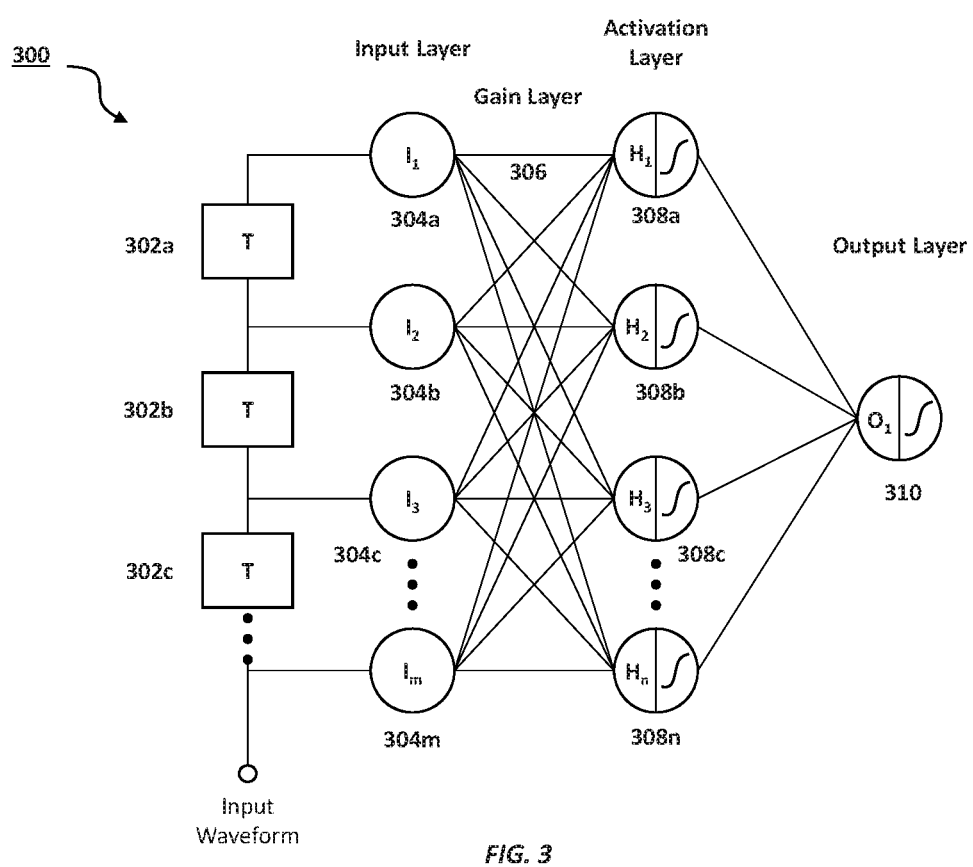
FIG. 3 is a schematic diagram of an example neural network interpreter in accordance with embodiments of the present disclosure.

FIG. 3 is a schematic diagram of an example neural network interpreter circuit 300 in accordance with embodiments of the present disclosure. The NN interpreter circuit 300 includes one or more delay circuit elements 302a-302c. The delay circuit elements can be implemented as a complementary metal oxide semiconductor (CMOS) circuit or other type of circuit element. The number of delay circuit elements can depend on the number of samples from the waveform are desired. For example, the number of delay circuit elements 302a-302c can equal m−1, where m is the number of samples from the waveform desired for the neural network input. The multiple samples from the input waveform are obtained from the series of analog delay blocks 302a-302c, which are labeled with "T." The delay blocks are a chain of delay components. The delay components provide voltage sampling points from an input waveform. The waveform propagates through the delay chain. Waveform samples are taken at each point represented by $I_1 \ldots I_m$. The time delay of each block is one mth of the unit interval, and m is the number of samples per UI.

The input waveform can be sampled at sampling elements 304a-304m (I1-Im). The samples can undergo gain through gain elements 306. Each gain element can include gain multipliers. One example implementation of the gain element is to use a multiplying digital-to-analog converter (MDAC), whose output is the product of the analog input voltage and one or more multiplication coefficients determined through training. For a 4-bit MDAC with differential current output, current output is most convenient for the successive summer circuits, which will convert the current into voltage. In case a voltage output is necessary, a current-voltage converter can be added as the output stage. The implementation of the neural network in CMOS process is also existing technology. The training is done by using a certain number of bit patterns. For applications in typical signal links used in computer systems, like memory and high-speed differential interfaces, the training process only needs to be done once at factory before the product is shipped.

The activation layer of the NN interpreter 300 includes one or more activation layer circuit elements 308a-308n (H1-Hn) that each include two aspects: first, an activation function is applied to the input from the gain branches from each sampling point; second, the inputs, after the activation function is applied, as summed by a summer circuit element. An example activation function implemented using a hardware circuit element can include a CMOS very large scale integrated (VLSI) Hyperbolic Tangent Function circuit element. Other types of hardware implemented activation functions can also be used. The output of each activation layer element can be provided to a single output element 310, which sums the outputs by a summer circuit element.

Advantages facilitated by the present disclosure are readily apparent to those of skill in the art. Among the advantages are:

(1) A higher data rate and/or lower bit-error-rate, because it is much more immune to random factors like jitter, noise, crosstalk (considered random when the aggressor bit pattern is unknown and independent from the victim).

(2) Compensation for non-linear effect. On the contrary, TXLE and CTLE can only compensate for linear effect. DFE is a non-linear operation but the compensation is still based on the linear superposition of data symbols.

(3) Potential lower cost and power consumption. The improvement of NN hardware implementation is being strongly driven by the rapidly increasing demand for machine learning. It is expected that the cost and power consumption of NN circuits will drop dramatically in the near future.

Figure 4:
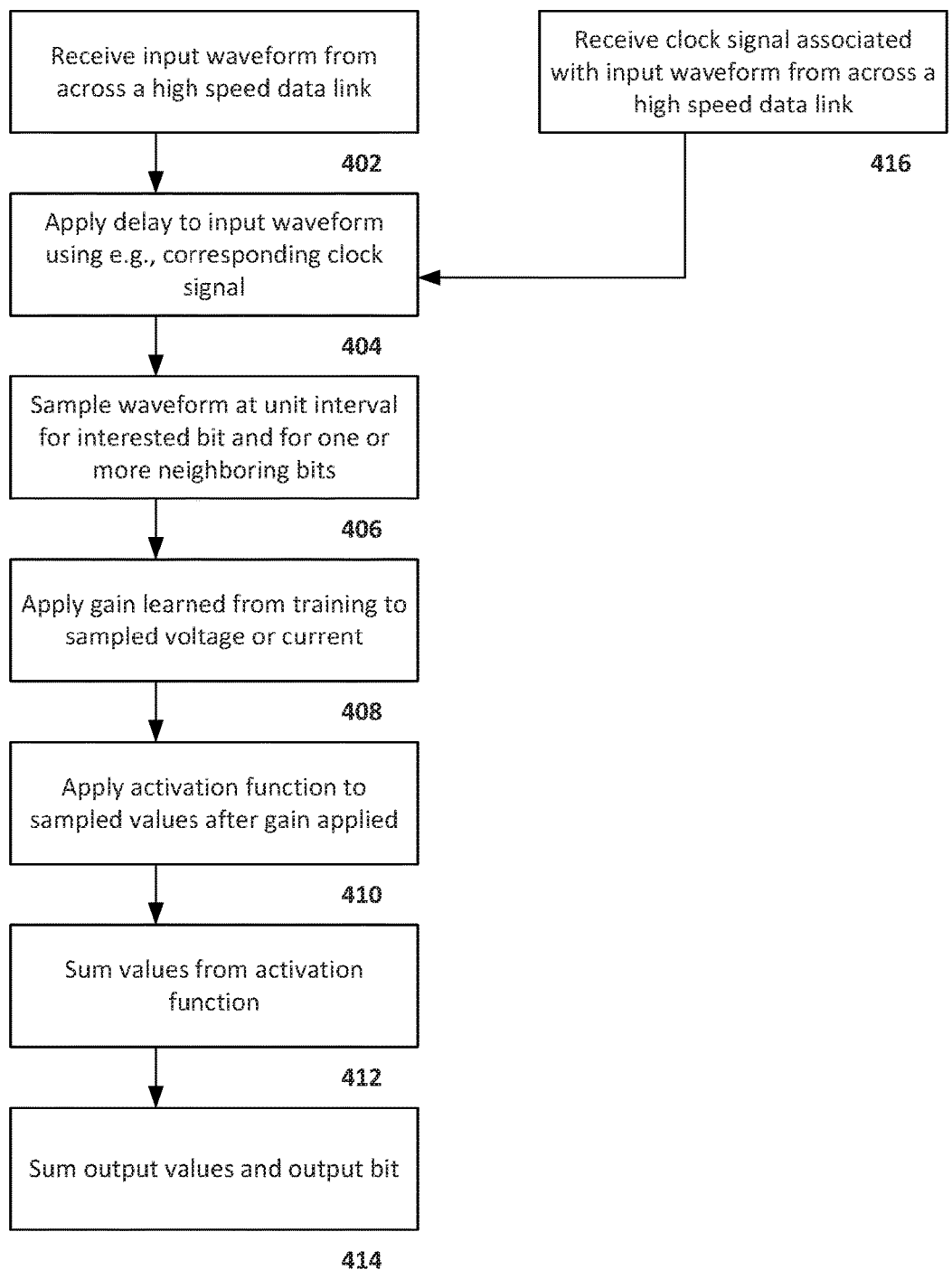
FIG. 4 is a process flow diagram for resolving a bit value based on sampling adjacent bits using a neural network circuit in accordance with embodiments of the present disclosure.

FIG. 4 is a process flow diagram 400 for resolving a bit value based on sampling adjacent bits using a neural network circuit in accordance with embodiments of the present disclosure. A data waveform can be received by a neural network-based circuit (NN interpreter) at a receiver from across a data link (402). A clock signal can also be received at the NN interpreter (416). The clock signal can be part of the data waveform, in which case the clock signal can be recovered by a recovery circuit, or the clock signal can be sent separately from the data waveform. The data waveform can be sampled by propagating the data waveform through a delay circuit (404). The delay circuit can include a plurality of delay circuit blocks that allow for sampling the waveform at different timing points (or sampling points) across the waveform. The delay circuit blocks can make use of the received clock signal to align the timing of the delay circuit blocks with the waveform.

The waveform voltage or current can be sampled at the interested bit and at neighboring bits (406). The waveform can be sampled at several timing points per unit interval (e.g., multiple sampling points per bit). A gain can be applied for each sampling point (408). The gain coefficients can be determined based on an initial training of the NN interpreter. The training is done by using a certain number of bit patterns. For applications in typical signal links used in computer systems, like memory and high-speed differential interfaces, the training process only needs to be done once at factory before the product is shipped.

At an activation layer of circuitry, each gain-modified sample is received by an activation function circuit, which is a circuit element that can apply an activation function to the received samples (410). There are N activation circuits and M samples. Each of the N activation circuits receives each of the M samples, and each of the M samples undergoes a gain via a gain branch interconnecting each M sample to each N activation circuit. The gain coefficients for each of the M samples can be different or the same, and each gain coefficient is determined through training. The received samples upon which activation function are applied are then summed by a summer circuit (412). All of the summed activation function-applied samples are summed as an output, the output representing a resolved bit for the interested bit (414).

Figure 5:
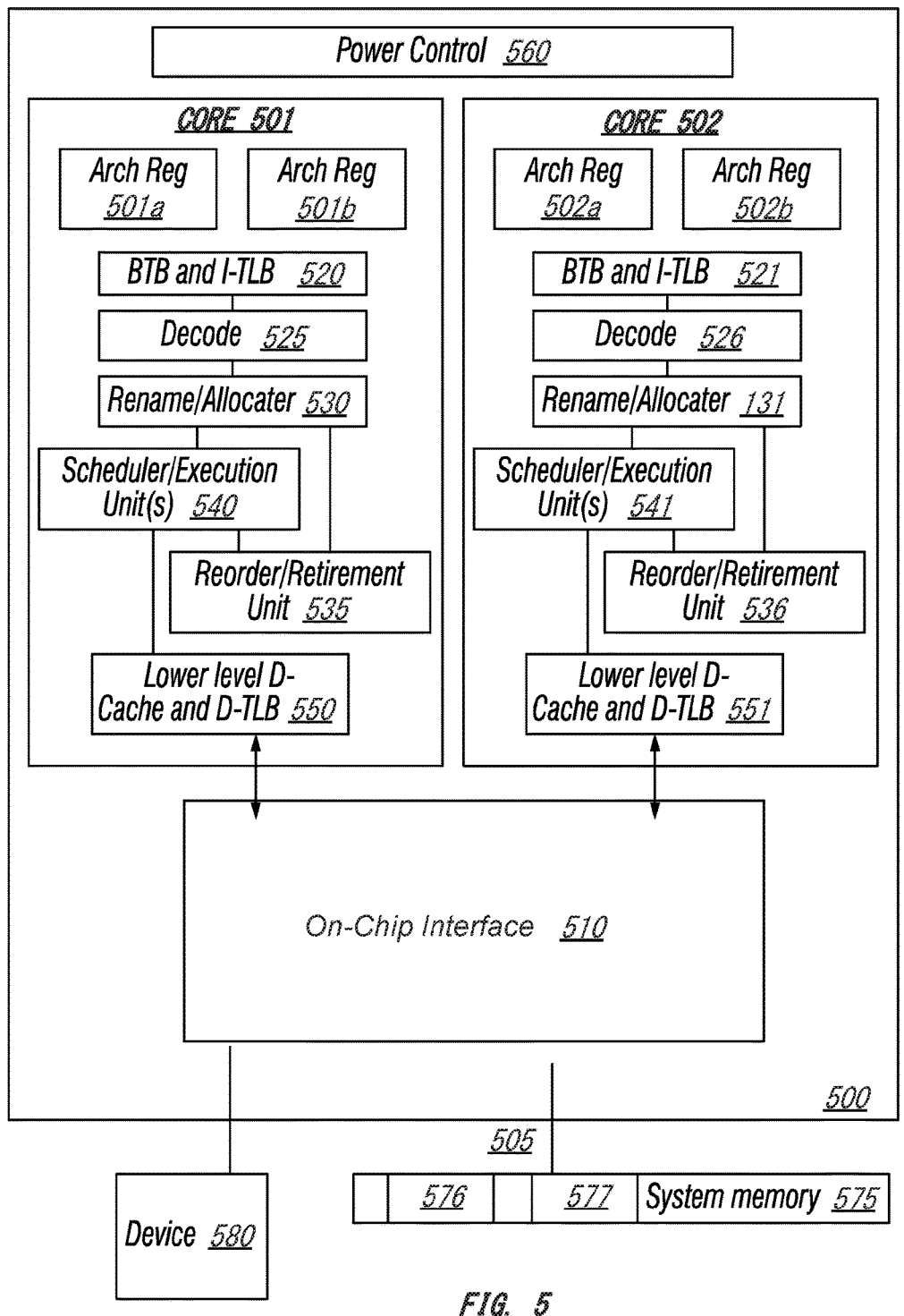
FIG. 5 illustrates an embodiment of a block diagram for a computing system including a multicore processor.

Referring to FIG. 5, an embodiment of a block diagram for a computing system including a multicore processor is depicted. Processor 500 includes any processor or processing device, such as a microprocessor, an embedded processor, a digital signal processor (DSP), a network processor, a handheld processor, an application processor, a co-processor, a system on a chip (SOC), or other device to execute code. Processor 500, in one embodiment, includes at least two cores—core 501 and 502, which may include asymmetric cores or symmetric cores (the illustrated embodiment). However, processor 500 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 500, as illustrated in FIG. 5, includes two cores—core 501 and 502. Here, core 501 and 502 are considered symmetric cores, i.e. cores with the same configurations, functional units, and/or logic. In another embodiment, core 501 includes an out-of-order processor core, while core 502 includes an in-order processor core. However, cores 501 and 502 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 501 are described in further detail below, as the units in core 502 operate in a similar manner in the depicted embodiment.

As depicted, core 501 includes two hardware threads 501a and 501b, which may also be referred to as hardware thread slots 501a and 501b. Therefore, software entities, such as an operating system, in one embodiment potentially view processor 500 as four separate processors, i.e., four logical processors or processing elements capable of executing four software threads concurrently. As alluded to above, a first thread is associated with architecture state registers 501a, a second thread is associated with architecture state registers 501b, a third thread may be associated with architecture state registers 502a, and a fourth thread may be associated with architecture state registers 502b. Here, each of the architecture state registers (501a, 501b, 502a, and 502b) may be referred to as processing elements, thread slots, or thread units, as described above. As illustrated, architecture state registers 501a are replicated in architecture state registers 501b, so individual architecture states/contexts are capable of being stored for logical processor 501a and logical processor 501*b*. In core 501, other smaller resources, such as instruction pointers and renaming logic in allocator and renamer block 530 may also be replicated for threads 501*a* and 501*b*. Some resources, such as re-order buffers in reorder/retirement unit 535, ILTB 520, load/store buffers, and queues may be shared through partitioning. Other resources, such as general purpose internal registers, page-table base register(s), low-level data-cache and data-TLB 515, execution unit(s) 540, and portions of out-of-order unit 535 are potentially fully shared.

Processor 500 often includes other resources, which may be fully shared, shared through partitioning, or dedicated by/to processing elements. In FIG. 5, an embodiment of a purely exemplary processor with illustrative logical units/resources of a processor is illustrated. Note that a processor may include, or omit, any of these functional units, as well as include any other known functional units, logic, or firmware not depicted. As illustrated, core 501 includes a simplified, representative out-of-order (OOO) processor core. But an in-order processor may be utilized in different embodiments. The OOO core includes a branch target buffer 520 to predict branches to be executed/taken and an instruction-translation buffer (I-TLB) 520 to store address translation entries for instructions.

Core 501 further includes decode module 525 coupled to fetch unit 520 to decode fetched elements. Fetch logic, in one embodiment, includes individual sequencers associated with thread slots 501*a*, 501*b*, respectively. Usually core 501 is associated with a first ISA, which defines/specifies instructions executable on processor 500. Often machine code instructions that are part of the first ISA include a portion of the instruction (referred to as an opcode), which references/specifies an instruction or operation to be performed. Decode logic 525 includes circuitry that recognizes these instructions from their opcodes and passes the decoded instructions on in the pipeline for processing as defined by the first ISA. For example, as discussed in more detail below decoders 525, in one embodiment, include logic designed or adapted to recognize specific instructions, such as transactional instruction. As a result of the recognition by decoders 525, the architecture or core 501 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 526, in one embodiment, recognize the same ISA (or a subset thereof). Alternatively, in a heterogeneous core environment, decoders 526 recognize a second ISA (either a subset of the first ISA or a distinct ISA).

In one example, allocator and renamer block 530 includes an allocator to reserve resources, such as register files to store instruction processing results. However, threads 501*a* and 501*b* are potentially capable of out-of-order execution, where allocator and renamer block 530 also reserves other resources, such as reorder buffers to track instruction results. Unit 530 may also include a register renamer to rename program/instruction reference registers to other registers internal to processor 500. Reorder/retirement unit 535 includes components, such as the reorder buffers mentioned above, load buffers, and store buffers, to support out-of-order execution and later in-order retirement of instructions executed out-of-order.

Scheduler and execution unit(s) block 540, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 550 are coupled to execution unit(s) 540. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 501 and 502 share access to higher-level or further-out cache, such as a second level cache associated with on-chip interface 510. Note that higher-level or further-out refers to cache levels increasing or getting further way from the execution unit(s). In one embodiment, higher-level cache is a last-level data cache—last cache in the memory hierarchy on processor 500—such as a second or third level data cache. However, higher level cache is not so limited, as it may be associated with or include an instruction cache. A trace cache—a type of instruction cache—instead may be coupled after decoder 525 to store recently decoded traces. Here, an instruction potentially refers to a macro-instruction (i.e. a general instruction recognized by the decoders), which may decode into a number of micro-instructions (micro-operations).

In the depicted configuration, processor 500 also includes on-chip interface module 510. Historically, a memory controller, which is described in more detail below, has been included in a computing system external to processor 500. In this scenario, on-chip interface 510 is to communicate with devices external to processor 500, such as system memory 575, a chipset (often including a memory controller hub to connect to memory 575 and an I/O controller hub to connect peripheral devices), a memory controller hub, a northbridge, or other integrated circuit. And in this scenario, bus 505 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 575 may be dedicated to processor 500 or shared with other devices in a system. Common examples of types of memory 575 include DRAM, SRAM, non-volatile memory (NV memory), and other known storage devices. Note that device 580 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 500. For example in one embodiment, a memory controller hub is on the same package and/or die with processor 500. Here, a portion of the core (an on-core portion) 510 includes one or more controller(s) for interfacing with other devices such as memory 575 or a graphics device 580. The configuration including an interconnect and controllers for interfacing with such devices is often referred to as an on-core (or un-core configuration). As an example, on-chip interface 510 includes a ring interconnect for on-chip communication and a high-speed serial point-to-point link 505 for off-chip communication. Yet, in the SOC environment, even more devices, such as the network interface, co-processors, memory 575, graphics processor 580, and any other known computer devices/interface may be integrated on a single die or integrated circuit to provide small form factor with high functionality and low power consumption.

In one embodiment, processor 500 is capable of executing a compiler, optimization, and/or translator code 577 to compile, translate, and/or optimize application code 576 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Figure 6:
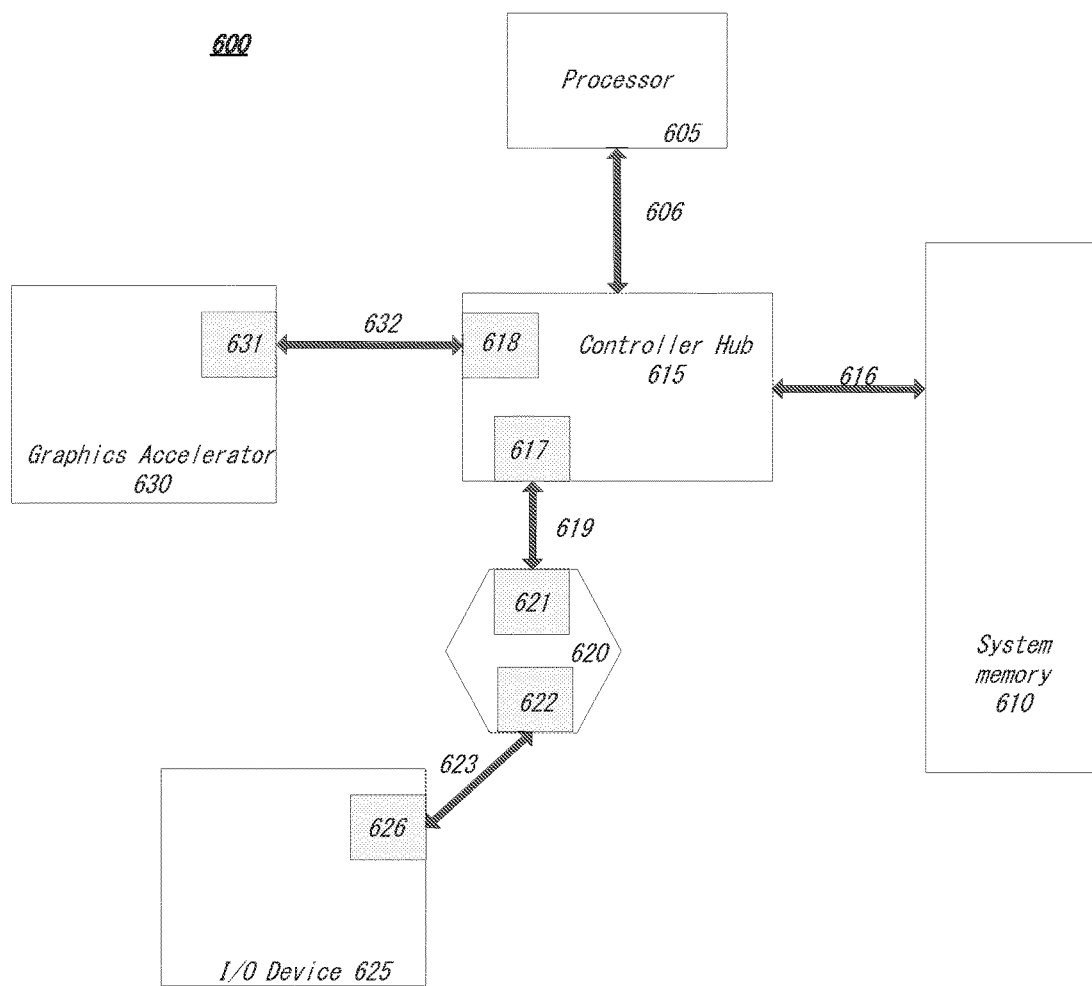
FIG. 6 illustrates an embodiment of a computing system including an interconnect architecture.

Referring to FIG. 6, an embodiment of a fabric composed of point-to-point Links that interconnect a set of components is illustrated. System 600 includes processor 605 and system memory 610 coupled to controller hub 615. Processor 605 includes any processing element, such as a microprocessor, a host processor, an embedded processor, a co-processor, or other processor. Processor 605 is coupled to controller hub 615 through front-side bus (FSB) 606. In one embodiment, FSB 606 is a serial point-to-point interconnect as described below. In another embodiment, link 606 includes a serial, differential interconnect architecture that is compliant with different interconnect standard.

System memory 610 includes any memory device, such as random access memory (RAM), non-volatile (NV) memory, or other memory accessible by devices in system 600. System memory 610 is coupled to controller hub 615 through memory interface 616. Examples of a memory interface include a double-data rate (DDR) memory interface, a dual-channel DDR memory interface, and a dynamic RAM (DRAM) memory interface.

In one embodiment, controller hub 615 is a root hub, root complex, or root controller in a Peripheral Component Interconnect Express (PCIe or PCIE) interconnection hierarchy. Examples of controller hub 615 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 605, while controller 615 is to communicate with I/O devices, in a similar manner as described below. In some embodiments, peer-to-peer routing is optionally supported through root complex 615.

Here, controller hub 615 is coupled to switch/bridge 620 through serial link 619. Input/output modules 617 and 621, which may also be referred to as interfaces/ports 617 and 621, include/implement a layered protocol stack to provide communication between controller hub 615 and switch 620. In one embodiment, multiple devices are capable of being coupled to switch 620.

Switch/bridge 620 routes packets/messages from device 625 upstream, i.e. up a hierarchy towards a root complex, to controller hub 615 and downstream, i.e. down a hierarchy away from a root controller, from processor 605 or system memory 610 to device 625. Switch 620, in one embodiment, is referred to as a logical assembly of multiple virtual PCI-to-PCI bridge devices. Device 625 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 625 may include a PCIe to PCI/PCI-X bridge to support legacy or other version PCI devices. Endpoint devices in PCIe are often classified as legacy, PCIe, or root complex integrated endpoints.

Graphics accelerator 630 is also coupled to controller hub 615 through serial link 632. In one embodiment, graphics accelerator 630 is coupled to an MCH, which is coupled to an ICH. Switch 620, and accordingly I/O device 625, is then coupled to the ICH. I/O modules 631 and 618 are also to implement a layered protocol stack to communicate between graphics accelerator 630 and controller hub 615. Similar to the MCH discussion above, a graphics controller or the graphics accelerator 630 itself may be integrated in processor 605.

Figure 7:
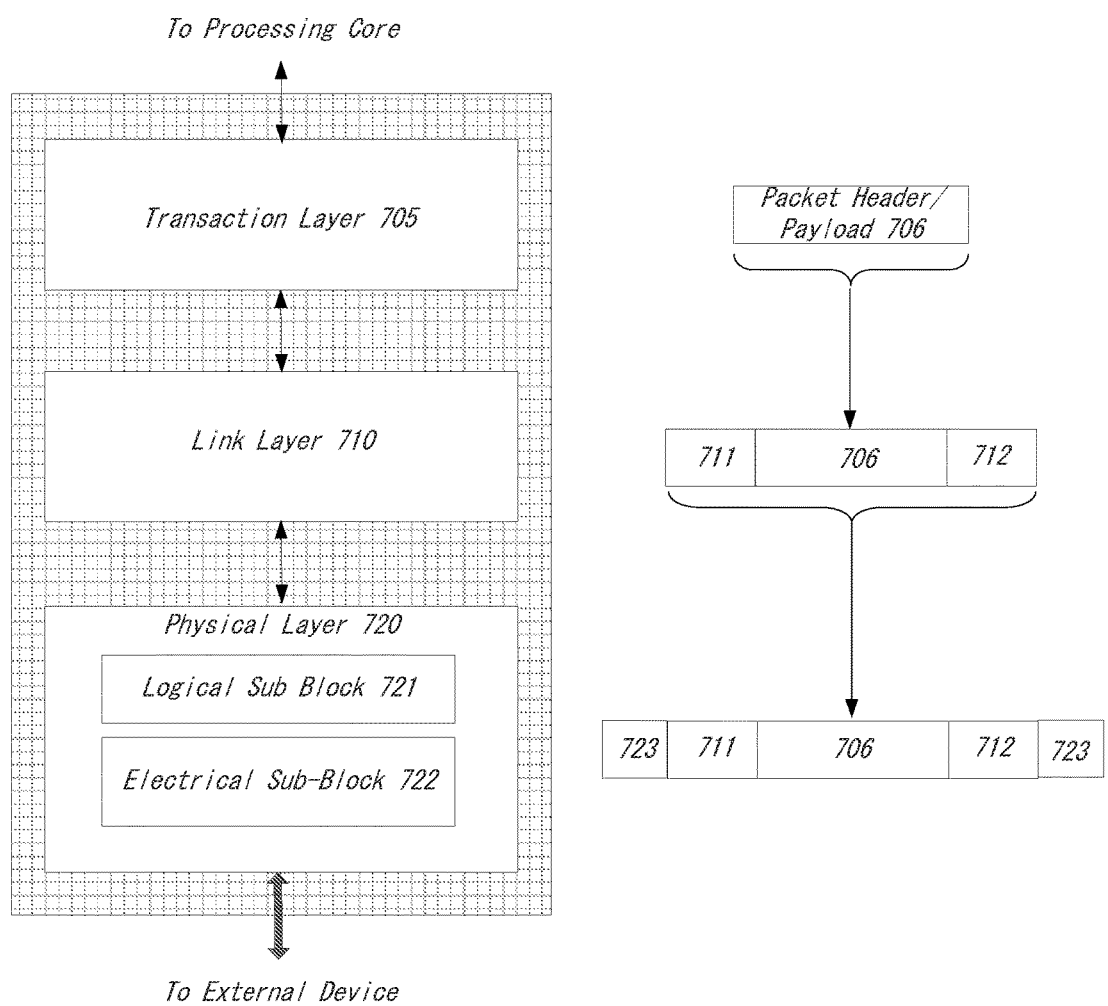
FIG. 7 illustrates an embodiment of a interconnect architecture including a layered stack.

Turning to FIG. 7 an embodiment of a layered protocol stack is illustrated. Layered protocol stack 700 includes any form of a layered communication stack, such as a Quick Path Interconnect (QPI) stack, a PCIe stack, a next generation high performance computing interconnect stack, or other layered stack. Although the discussion immediately below in reference to FIGS. 6-9 are in relation to a PCIe stack, the same concepts may be applied to other interconnect stacks. In one embodiment, protocol stack 700 is a PCIe protocol stack including transaction layer 705, link layer 710, and physical layer 720. An interface, such as interfaces 617, 618, 621, 622, 626, and 631 in FIG. 6, may be represented as communication protocol stack 700. Representation as a communication protocol stack may also be referred to as a module or interface implementing/including a protocol stack.

PCI Express uses packets to communicate information between components. Packets are formed in the Transaction Layer 705 and Data Link Layer 710 to carry the information from the transmitting component to the receiving component. As the transmitted packets flow through the other layers, they are extended with additional information necessary to handle packets at those layers. At the receiving side the reverse process occurs and packets get transformed from their Physical Layer 720 representation to the Data Link Layer 710 representation and finally (for Transaction Layer Packets) to the form that can be processed by the Transaction Layer 705 of the receiving device.

Transaction Layer

In one embodiment, transaction layer 705 is to provide an interface between a device's processing core and the interconnect architecture, such as data link layer 710 and physical layer 720. In this regard, a primary responsibility of the transaction layer 705 is the assembly and disassembly of packets (i.e., transaction layer packets, or TLPs). The translation layer 705 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 705. An external device at the opposite end of the link, such as controller hub 615 in FIG. 6, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 705 assembles packet header/payload 706. Format for current packet headers/payloads may be found in the PCIe specification at the PCIe specification website.

Figure 8:
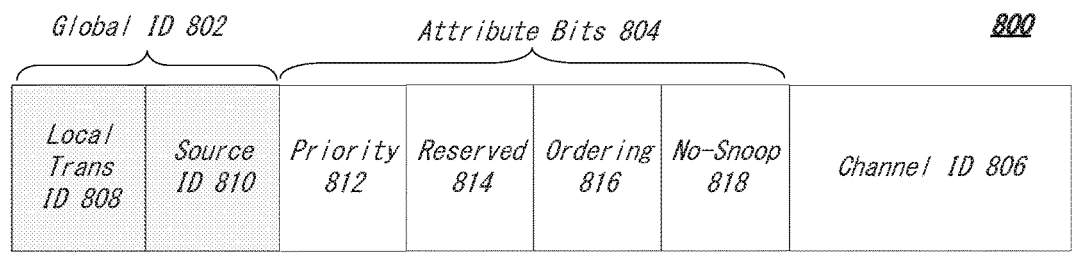
FIG. 8 illustrates an embodiment of a request or packet to be generated or received within an interconnect architecture.

Quickly referring to FIG. 8, an embodiment of a PCIe transaction descriptor is illustrated. In one embodiment, transaction descriptor 800 is a mechanism for carrying transaction information. In this regard, transaction descriptor 800 supports identification of transactions in a system. Other potential uses include tracking modifications of default transaction ordering and association of transaction with channels.

Transaction descriptor 800 includes global identifier field 802, attributes field 804 and channel identifier field 806. In the illustrated example, global identifier field 802 is depicted comprising local transaction identifier field 808 and source identifier field 810. In one embodiment, global transaction identifier 802 is unique for all outstanding requests.

According to one implementation, local transaction identifier field 808 is a field generated by a requesting agent, and it is unique for all outstanding requests that require a completion for that requesting agent. Furthermore, in this example, source identifier 810 uniquely identifies the requestor agent within a PCIe hierarchy. Accordingly, together with source ID 810, local transaction identifier 808 field provides global identification of a transaction within a hierarchy domain.

Attributes field 804 specifies characteristics and relationships of the transaction. In this regard, attributes field 804 is potentially used to provide additional information that allows modification of the default handling of transactions. In one embodiment, attributes field 804 includes priority field 812, reserved field 814, ordering field 816, and no-snoop field 818. Here, priority sub-field 812 may be modified by an initiator to assign a priority to the transaction. Reserved attribute field 814 is left reserved for future, or vendor-defined usage. Possible usage models using priority or security attributes may be implemented using the reserved attribute field.

In this example, ordering attribute field 816 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 818 is utilized to determine if transactions are snooped. As shown, channel ID Field 806 identifies a channel that a transaction is associated with.

Link Layer

Link layer 710, also referred to as data link layer 710, acts as an intermediate stage between transaction layer 705 and the physical layer 720. In one embodiment, a responsibility of the data link layer 710 is providing a reliable mechanism for exchanging Transaction Layer Packets (TLPs) between two components a link. One side of the Data Link Layer 710 accepts TLPs assembled by the Transaction Layer 705, applies packet sequence identifier 711, i.e. an identification number or packet number, calculates and applies an error detection code, i.e. CRC 712, and submits the modified TLPs to the Physical Layer 720 for transmission across a physical to an external device.

Physical Layer

In one embodiment, physical layer 720 includes logical sub block 721 and electrical sub-block 722 to physically transmit a packet to an external device. Here, logical sub-block 721 is responsible for the "digital" functions of Physical Layer 721. In this regard, the logical sub-block includes a transmit section to prepare outgoing information for transmission by physical sub-block 722, and a receiver section to identify and prepare received information before passing it to the Link Layer 710.

Physical block 722 includes a transmitter and a receiver. The transmitter is supplied by logical sub-block 721 with symbols, which the transmitter serializes and transmits onto to an external device. The receiver is supplied with serialized symbols from an external device and transforms the received signals into a bit-stream. The bit-stream is de-serialized and supplied to logical sub-block 721. In one embodiment, an 8$b$/10$b$ transmission code is employed, where ten-bit symbols are transmitted/received. Here, special symbols are used to frame a packet with frames 723. In addition, in one example, the receiver also provides a symbol clock recovered from the incoming serial stream.

As stated above, although transaction layer 705, link layer 710, and physical layer 720 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 9:
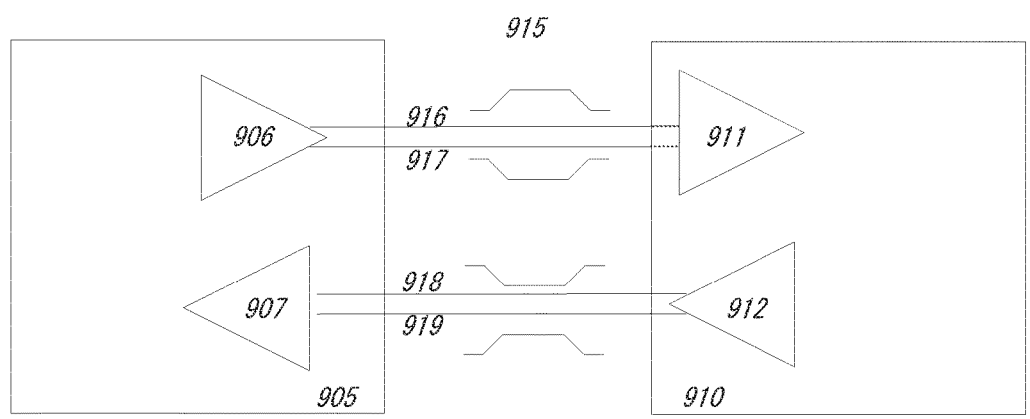
FIG. 9 illustrates an embodiment of a transmitter and receiver pair for an interconnect architecture.

Referring next to FIG. 9, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 906/911 and a receive pair 912/907. Accordingly, device 905 includes transmission logic 906 to transmit data to device 910 and receiving logic 907 to receive data from device 910. In other words, two transmitting paths, i.e. paths 916 and 917, and two receiving paths, i.e. paths 918 and 919, are included in a PCIe link.

A transmission path refers to any path for transmitting data, such as a transmission line, a copper line, an optical line, a wireless communication channel, an infrared communication link, or other communication path. A connection between two devices, such as device 905 and device 910, is referred to as a link, such as link 915. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 916 and 917, to transmit differential signals. As an example, when line 916 toggles from a low voltage level to a high voltage level, i.e. a rising edge, line 917 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

Note that the apparatus', methods', and systems described above may be implemented in any electronic device or system as aforementioned. As specific illustrations, the figures below provide exemplary systems for utilizing the disclosure as described herein. As the systems below are described in more detail, a number of different interconnects are disclosed, described, and revisited from the discussion above. And as is readily apparent, the advances described above may be applied to any of those interconnects, fabrics, or architectures.

Figure 10:
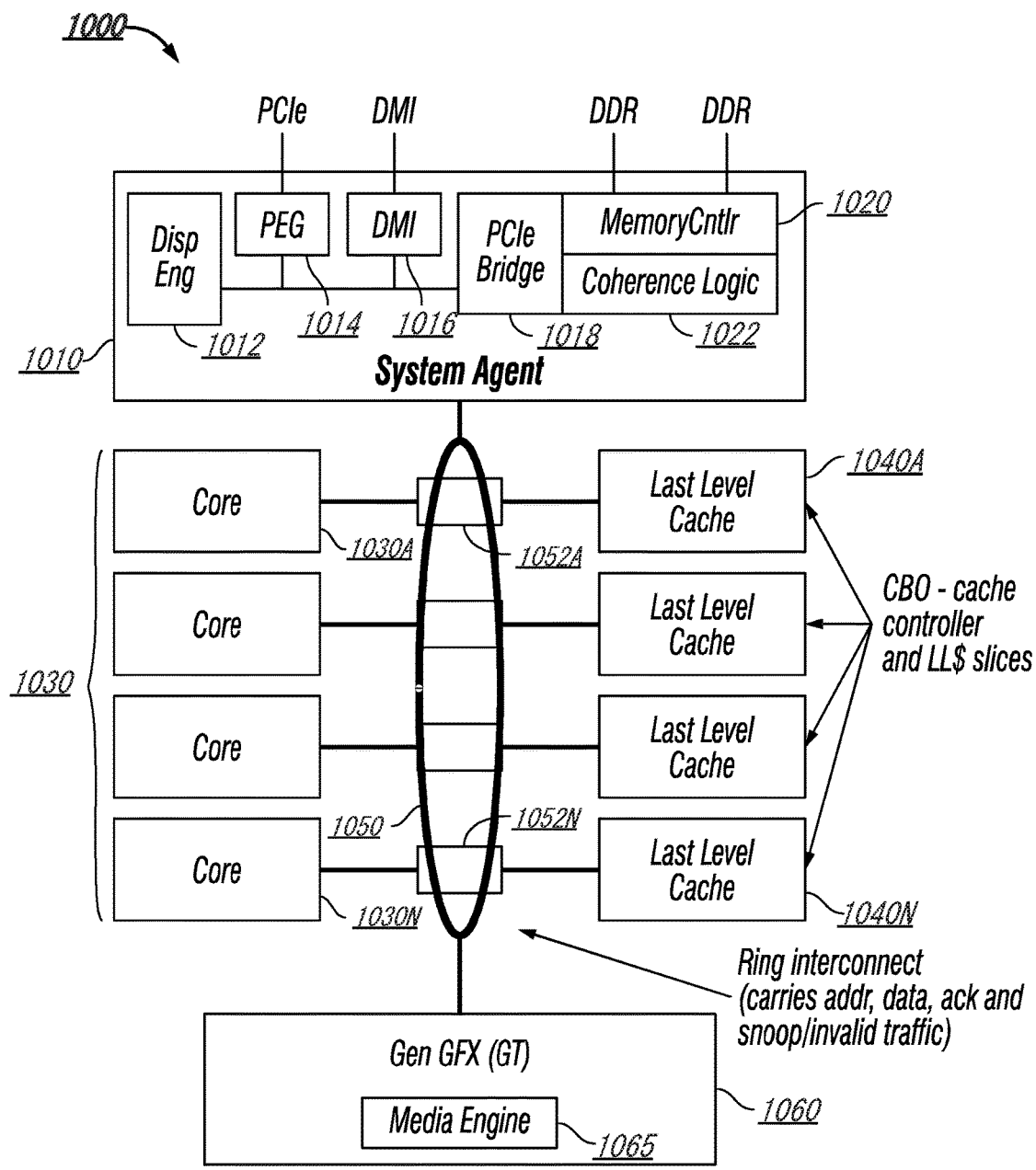
FIG. 10 illustrates a block diagram of an embodiment of a multicore processor.

Referring now to FIG. 10, shown is a block diagram of an embodiment of a multicore processor. As shown in the embodiment of FIG. 10, processor 1000 includes multiple domains. Specifically, a core domain 1030 includes a plurality of cores 1030A-1030N, a graphics domain 1060 includes one or more graphics engines having a media engine 1065, and a system agent domain 1010.

In various embodiments, system agent domain 1010 handles power control events and power management, such that individual units of domains 1030 and 1060 (e.g. cores and/or graphics engines) are independently controllable to dynamically operate at an appropriate power mode/level (e.g. active, turbo, sleep, hibernate, deep sleep, or other Advanced Configuration Power Interface like state) in light of the activity (or inactivity) occurring in the given unit. Each of domains 1030 and 1060 may operate at different voltage and/or power, and furthermore the individual units within the domains each potentially operate at an independent frequency and voltage. Note that while only shown with three domains, understand the scope of the present disclosure is not limited in this regard and additional domains may be present in other embodiments.

As shown, each core 1030 further includes low level caches in addition to various execution units and additional processing elements. Here, the various cores are coupled to each other and to a shared cache memory that is formed of a plurality of units or slices of a last level cache (LLC) 1040A-1040N; these LLCs often include storage and cache controller functionality and are shared amongst the cores, as well as potentially among the graphics engine too.

As seen, a ring interconnect 1050 couples the cores together, and provides interconnection between the core domain 1030, graphics domain 1060 and system agent circuitry 1010, via a plurality of ring stops 1052A-1052N, each at a coupling between a core and LLC slice. As seen in FIG. 10, interconnect 1050 is used to carry various information, including address information, data information, acknowledgement information, and snoop/invalid information. Although a ring interconnect is illustrated, any known on-die interconnect or fabric may be utilized. As an illustrative example, some of the fabrics discussed above (e.g. another on-die interconnect, Intel On-chip System Fabric (IOSF), an Advanced Microcontroller Bus Architecture (AMBA) interconnect, a multi-dimensional mesh fabric, or other known interconnect architecture) may be utilized in a similar fashion.

As further depicted, system agent domain 1010 includes display engine 1012 which is to provide control of and an interface to an associated display. System agent domain 1010 may include other units, such as: an integrated memory controller 1020 that provides for an interface to a system memory (e.g., a DRAM implemented with multiple DIMMs; coherence logic 1022 to perform memory coherence operations. Multiple interfaces may be present to enable interconnection between the processor and other circuitry. For example, in one embodiment at least one direct media interface (DMI) 1016 interface is provided as well as one or more PCIe™ interfaces 1014. The display engine and these interfaces typically couple to memory via a PCIe™ bridge 1018. Still further, to provide for communications between other agents, such as additional processors or other circuitry, one or more other interfaces (e.g. an Intel® Quick Path Interconnect (QPI) fabric) may be provided.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

The following paragraphs provide examples of various ones of the embodiments disclosed herein.

Example 1 is a receiver apparatus configured to receive a data waveform from across a data link, the receiver apparatus including a neural network circuit to receive a data waveform from the data link; sample the data waveform at a plurality of timing locations of the data waveform; and determine a bit value for the data waveform based on the sample of the waveform form the plurality of timing locations.

Example 2 may include the subject matter of example 1, wherein the neural network circuit comprises a plurality of delay circuits to delay the data waveform, the plurality of delay circuits including a first delay circuit in series with a second delay circuit, and wherein the neural network circuit comprises a first sample input at an input to the first delay circuit, a second sample input at an output of the first delay circuit, and a third sample input at an output of the second delay circuit.

Example 3 may include the subject matter of example 2, and can also include a plurality of activation function circuit elements to apply an activation function to one or more samples of the data waveform.

Example 4 may include the subject matter of example 3, and can also include a summer circuit element residing at an output of each activation function circuit elements, the summer circuit element to sum each of the one or more samples of the data waveform having undergone the application of the activation function.

Example 5 may include the subject matter of example 3, and can also include a gain circuit element interconnecting each sample input to each activation element of the plurality of activation elements.

Example 6 may include the subject matter of example 5, wherein the gain circuit element is configured to apply a gain to a sample of the waveform using one or more gain coefficients.

Example 7 may include the subject matter of any of examples 2-6, and can also include an output summer circuit, wherein each activation function circuit element is coupled to the output summer circuit, the output summer circuit to sum the outputs of each of the plurality of activation function circuit elements and to output a bit value representative of an interested bit from the data waveform.

Example 8 may include the subject matter of any of examples 2-7, and can also include a clock recovery circuit element to recover a clock signal received with the data waveform and output the clock signal to the neural network circuit, the neural network circuit configured to use the clock signal to delay the waveform.

Example 9 is a method for resolving a bit value from a received data waveform, the method including receiving a data waveform at a neural network circuit element; sampling the data waveform at a timing location representative of an interested bit; sampling the data waveform at one or more timing locations representative of one or more bits adjacent to the timing location representative of the interested bit; and determining a bit value for the interested bit based on the sampling of the data waveform at a timing location representative of the interested bit and the sampling of the data waveform at one or more timing locations representative of one or more bits adjacent to the timing location representative of the interested bit.

Example 10 may include the subject matter of example 9, wherein sampling the data waveform at a timing location representative of an interested bit and sampling the data waveform at one or more timing locations representative of one or more bits adjacent to the timing location representative of the interested bit can include delaying the data waveform by one or more delay circuits; and wherein sampling the data waveform at a timing location representative of an interested bit comprises sampling the data waveform at multiple timing locations across a unit interval corresponding to the interested bit; and wherein sampling the data waveform at one or more timing locations representative of one or more bits adjacent to the timing location representative of the interested bit comprises sampling the data waveform at multiple timing locations across each unit interval corresponding to each neighboring bit to the interested bit.

Example 11 may include the subject matter of example 9, wherein determining a bit value for the interested bit based on the sampling of the data waveform at a timing location representative of the interested bit and the sampling of the data waveform at one or more timing locations representative of one or more bits adjacent to the timing location representative of the interested bit can include applying an activation function to one or more samples of the data waveform from the timing location representative of an interested bit; applying an activation function to one or more samples of the data waveform from the one or more timing locations representative of one or more bits adjacent to the timing location representative of the interested bit; and summing the samples of the data waveform after applying the activation functions.

Example 12 may include the subject matter of example 11, and can also include applying a gain to one or more samples of the data waveform from the timing location representative of an interested bit prior to applying the activation function; and applying a gain to one or more samples of the data waveform from the one or more timing locations representative of one or more bits adjacent to the timing location representative of the interested bit after applying the activation function.

Example 13 may include the subject matter of any of examples 9-12, and can also include training a gain circuit to determine a gain coefficient for applying the gain to one or more samples of the data waveform from the timing location representative of an interested bit and training a circuit to determine a gain coefficient for applying a gain to one or more samples of the data waveform from the one or more timing locations representative of one or more bits adjacent to the timing location representative of the interested bit after applying the activation function.

Example 14 may include the subject matter of example 11, and can also include summing the summed samples and outputting a bit value representative of the interested bit.

Example 15 is a system that includes a data transmitter to transmit a data waveform; a data receiver to receive a data waveform from the data transmitter; and a data link coupling the data transmitter with the data receiver. The data receiver can include a neural network circuit to receive a data waveform from the data link; sample the data waveform at a plurality of timing locations of the data waveform; and determine a bit value for the data waveform based on the sample of the waveform form the plurality of timing locations.

Example 16 may include the subject matter of example 15, wherein the neural network circuit comprises a plurality of delay circuits to delay the data waveform, the plurality of delay circuits can include a first delay circuit in series with a second delay circuit; wherein the neural network circuit comprises a first sample input at an input to the first delay circuit, a second sample input at an output of the first delay circuit, and a third sample input at an output of the second delay circuit.

Example 17 may include the subject matter of example 16, and can also include a plurality of activation function circuit elements to apply an activation function to one or more samples of the data waveform.

Example 18 may include the subject matter of example 17, and can also include a summer circuit element residing at an output of each activation function circuit elements, the summer circuit element to sum each of the one or more samples of the data waveform having undergone the application of the activation function.

Example 19 may include the subject matter of example 17, and can also include a gain circuit element interconnecting each sample input to each activation element of the plurality of activation elements.

Example 20 may include the subject matter of example 19, wherein the gain circuit element is configured to apply a gain to a sample of the waveform using one or more gain coefficients.

Example 21 may include the subject matter of any of examples 16-20, and can also include an output summer circuit, wherein each activation function circuit element is coupled to the output summer circuit, the output summer circuit to sum the outputs of each of the plurality of activation function circuit elements and to output a bit value representative of an interested bit from the data waveform.

Example 22 may include the subject matter of any of examples 15-22, and can also include a clock recovery circuit element to recover a clock signal received with the data waveform and output the clock signal to the neural network circuit, the neural network circuit configured to use the clock signal to delay the waveform.

Example 23 may include the subject matter of any of examples 15-22, wherein the data link comprises a high speed data link.

Example 24 is a receiver apparatus configured to receive a data waveform from across a data link, the receiver apparatus including a neural network means for receiving a data waveform from the data link; sampling the data waveform at a plurality of timing locations of the data waveform; and determining a bit value for the data waveform based on the sample of the waveform form the plurality of timing locations.

Example 25 may include the subject matter of example 24, wherein the neural network means comprises a means for delaying the data waveform comprising a first delay circuit in series with a second delay circuit; wherein the neural network circuit includes a first sample input at an input to the first delay circuit, a second sample input at an output of the first delay circuit, and a third sample input at an output of the second delay circuit.

Example 26 may include the subject matter of example 25, and can also include a means for applying an activation function to one or more samples of the data waveform.

Example 27 may include the subject matter of example 26, and can also include a means for summing input samples to sum each of the one or more samples of the data waveform having undergone the application of the activation function.

What is claimed is:
1. A receiver apparatus configured to receive a data waveform from across a data link, the receiver apparatus comprising:
   a neural network circuit to:
      receive the data waveform from the data link;
      sample the data waveform at a plurality of timing locations of the data waveform; and
      determine a bit value for the data waveform based on the sample of the waveform from the plurality of timing locations;

wherein the neural network circuit comprises a plurality of delay circuits to delay the data waveform, the plurality of delay circuits comprising:
a first delay circuit in series with a second delay circuit;
wherein the neural network circuit comprises a first sample input at an input to the first delay circuit, a second sample input at an output of the first delay circuit, and a third sample input at an output of the second delay circuit;
the receiver apparatus further comprising:
 a plurality of activation function circuit elements to apply an activation function to one or more samples of the data waveform; and
 a gain circuit element interconnecting each sample input to each activation element of the plurality of activation elements.

2. The receiver apparatus of claim 1, further comprising a summer circuit element residing at an output of each activation function circuit elements, the summer circuit element to sum each of the one or more samples of the data waveform having undergone the application of the activation function.

3. The receiver apparatus of claim 1, wherein the gain circuit element is configured to apply a gain to a sample of the waveform using one or more gain coefficients.

4. The receiver apparatus of claim 1, further comprising an output summer circuit, wherein each activation function circuit element is coupled to the output summer circuit, the output summer circuit to sum the outputs of each of the plurality of activation function circuit elements and to output a bit value representative of an interested bit from the data waveform.

5. The receiver apparatus of claim 1, further comprising a clock recovery circuit element to recover a clock signal received with the data waveform and output the clock signal to the neural network circuit, the neural network circuit configured to use the clock signal to delay the waveform.

6. A method for resolving a bit value from a received data waveform, the method comprising:
 receiving the data waveform at a neural network circuit element;
 sampling the data waveform at a timing location representative of an interested bit;
 sampling the data waveform at one or more timing locations representative of one or more bits adjacent to the timing location representative of the interested bit; and
 determining the bit value for the interested bit based on the sampling of the data waveform at a timing location representative of the interested bit and the sampling of the data waveform at one or more timing locations representative of one or more bits adjacent to the timing location representative of the interested bit.

7. The method of claim 6, wherein sampling the data waveform at a timing location representative of an interested bit and sampling the data waveform at one or more timing locations representative of one or more bits adjacent to the timing location representative of the interested bit comprise:
 delaying the data waveform by one or more delay circuits; and
 wherein sampling the data waveform at a timing location representative of an interested bit comprises sampling the data waveform at multiple timing locations across a unit interval corresponding to the interested bit; and
 wherein sampling the data waveform at one or more timing locations representative of one or more bits adjacent to the timing location representative of the interested bit comprises sampling the data waveform at multiple timing locations across each unit interval corresponding to each neighboring bit to the interested bit.

8. The method of claim 6, wherein determining a bit value for the interested bit based on the sampling of the data waveform at a timing location representative of the interested bit and the sampling of the data waveform at one or more timing locations representative of one or more bits adjacent to the timing location representative of the interested bit comprises:
 applying an activation function to one or more samples of the data waveform from the timing location representative of an interested bit;
 applying an activation function to one or more samples of the data waveform from the one or more timing locations representative of one or more bits adjacent to the timing location representative of the interested bit; and
 summing the samples of the data waveform after applying the activation functions.

9. The method of claim 8, further comprising:
 applying a gain to one or more samples of the data waveform from the timing location representative of an interested bit prior to applying the activation function; and
 applying a gain to one or more samples of the data waveform from the one or more timing locations representative of one or more bits adjacent to the timing location representative of the interested bit after applying the activation function.

10. The method of claim 6, further comprising training a gain circuit to determine a gain coefficient for applying the gain to one or more samples of the data waveform from the timing location representative of an interested bit and training a circuit to determine a gain coefficient for applying a gain to one or more samples of the data waveform from the one or more timing locations representative of one or more bits adjacent to the timing location representative of the interested bit after applying the activation function.

11. The method of claim 10, further comprising summing the summed samples and outputting a bit value representative of the interested bit.

12. A system comprising:
 a data transmitter to transmit a data waveform;
 a data receiver to receive the data waveform from the data transmitter; and
 a data link coupling the data transmitter with the data receiver;
 the data receiver comprising:
 a neural network circuit to:
  receive the data waveform from the data link;
  sample the data waveform at a plurality of timing locations of the data waveform; and
  determine a bit value for the data waveform based on the sample of the waveform from the plurality of timing locations;
 wherein the neural network circuit comprises a plurality of delay circuits to delay the data waveform, the plurality of delay circuits comprising:
 a first delay circuit in series with a second delay circuit;
 wherein the neural network circuit comprises a first sample input at an input to the first delay circuit, a second sample input at an output of the first delay circuit, and a third sample input at an output of the second delay circuit;

the system further comprising:
- a plurality of activation function circuit elements to apply an activation function to one or more samples of the data waveform; and
- further comprising a gain circuit element interconnecting each sample input to each activation element of the plurality of activation elements.

13. The system of claim 12, further comprising a summer circuit element residing at an output of each activation function circuit elements, the summer circuit element to sum each of the one or more samples of the data waveform having undergone the application of the activation function.

14. The system of claim 12, wherein the gain circuit element is configured to apply a gain to a sample of the waveform using one or more gain coefficients.

15. The system of claim 12, further comprising an output summer circuit, wherein each activation function circuit element is coupled to the output summer circuit, the output summer circuit to sum the outputs of each of the plurality of activation function circuit elements and to output a bit value representative of an interested bit from the data waveform.

16. The system of claim 12, further comprising a clock recovery circuit element to recover a clock signal received with the data waveform and output the clock signal to the neural network circuit, the neural network circuit configured to use the clock signal to delay the waveform.

17. The system of claim 12, wherein the data link comprises a high speed data link.

* * * * *